July 19, 1932.  T. L. GREEN ET AL  1,868,317
METHOD AND MACHINE FOR SHEETING AND FOLDING PLASTIC MATERIALS
Filed May 10, 1929   11 Sheets-Sheet 4
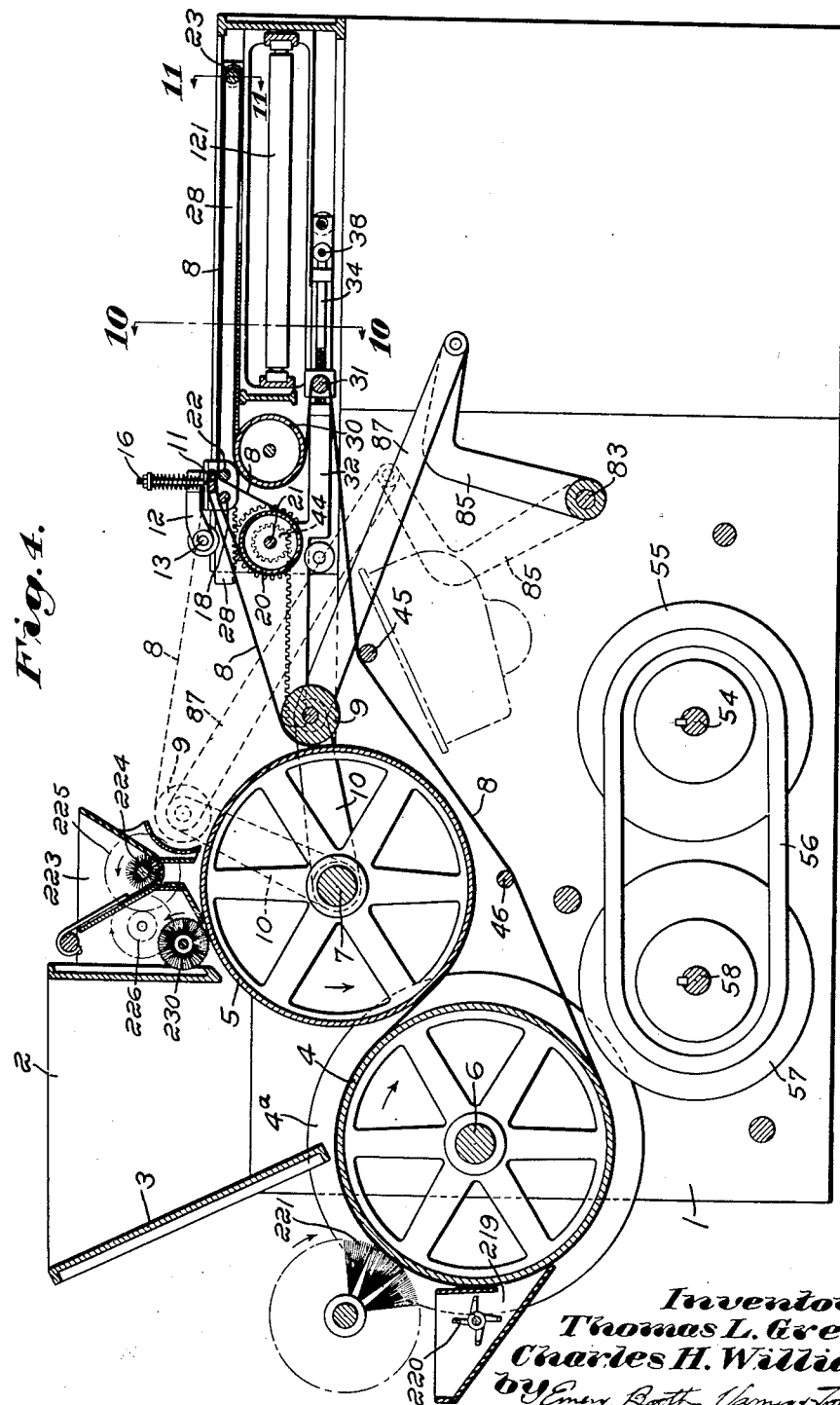

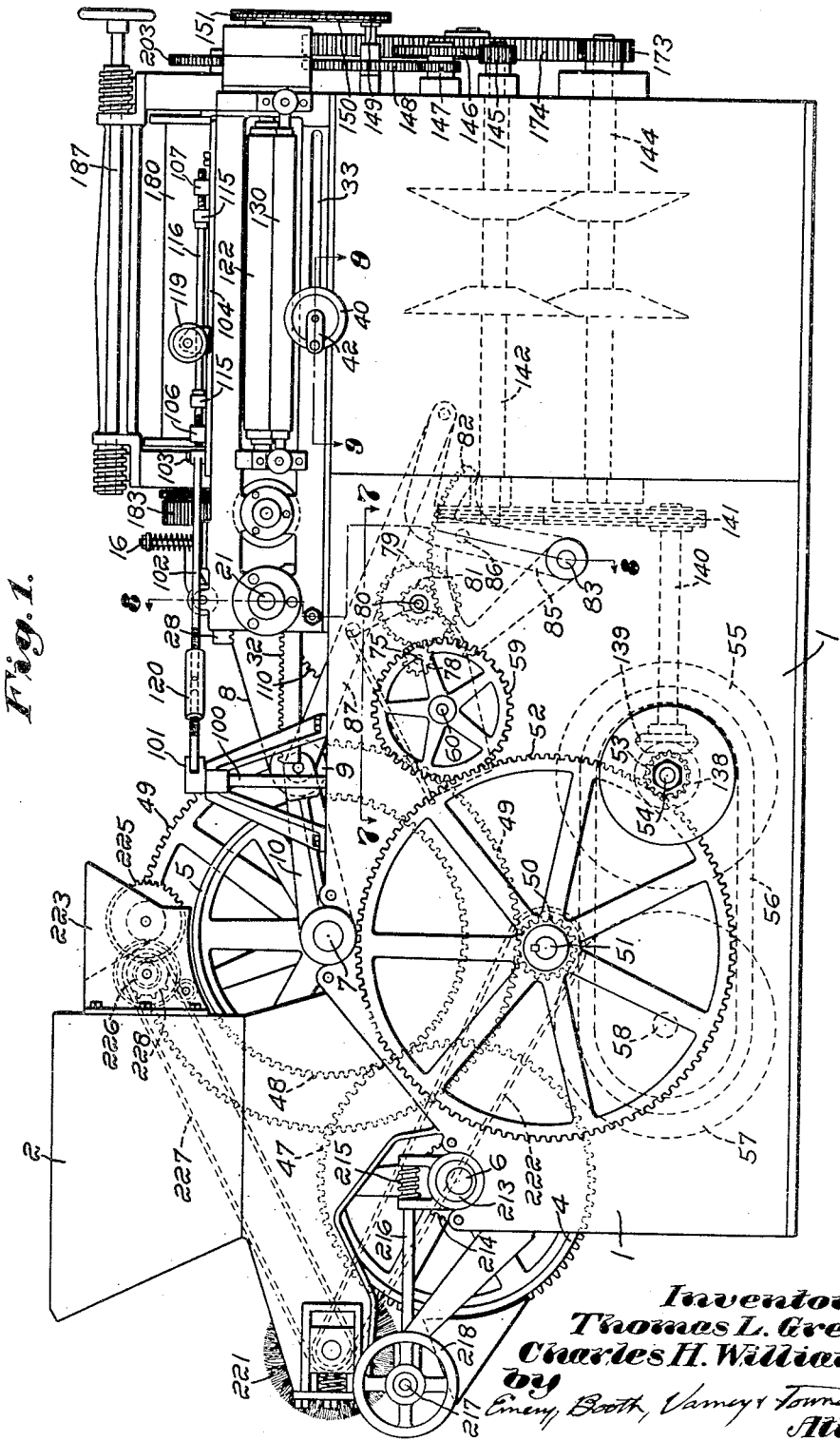

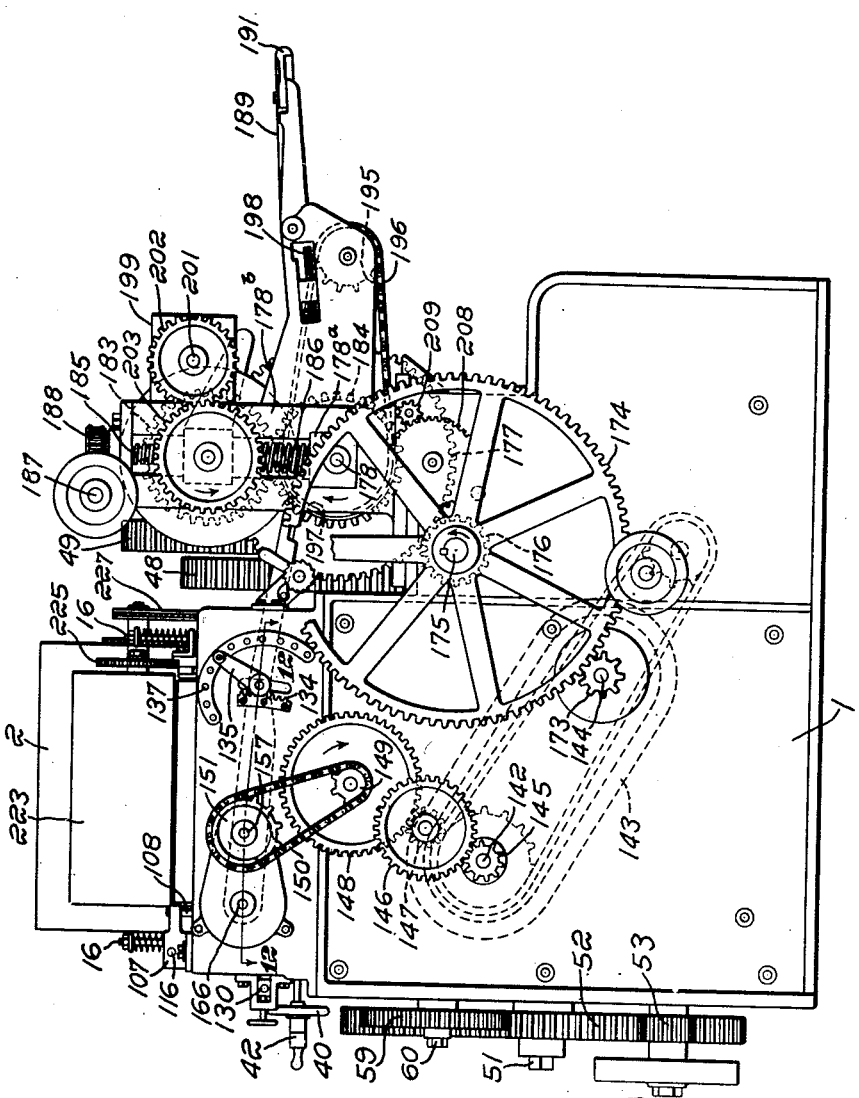

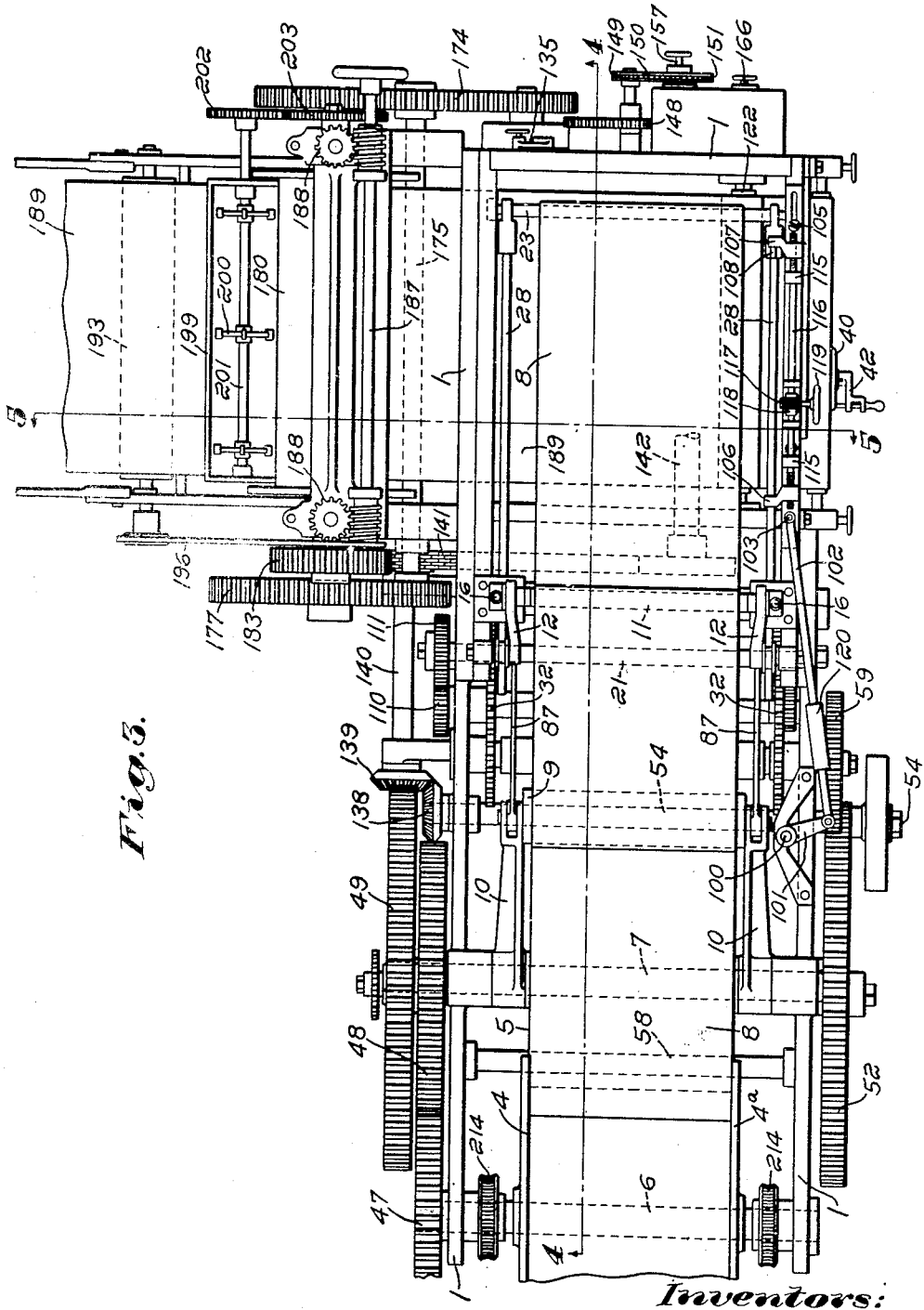

July 19, 1932.  T. L. GREEN ET AL  1,868,317
METHOD AND MACHINE FOR SHEETING AND FOLDING PLASTIC MATERIALS
Filed May 10, 1929  11 Sheets-Sheet 5
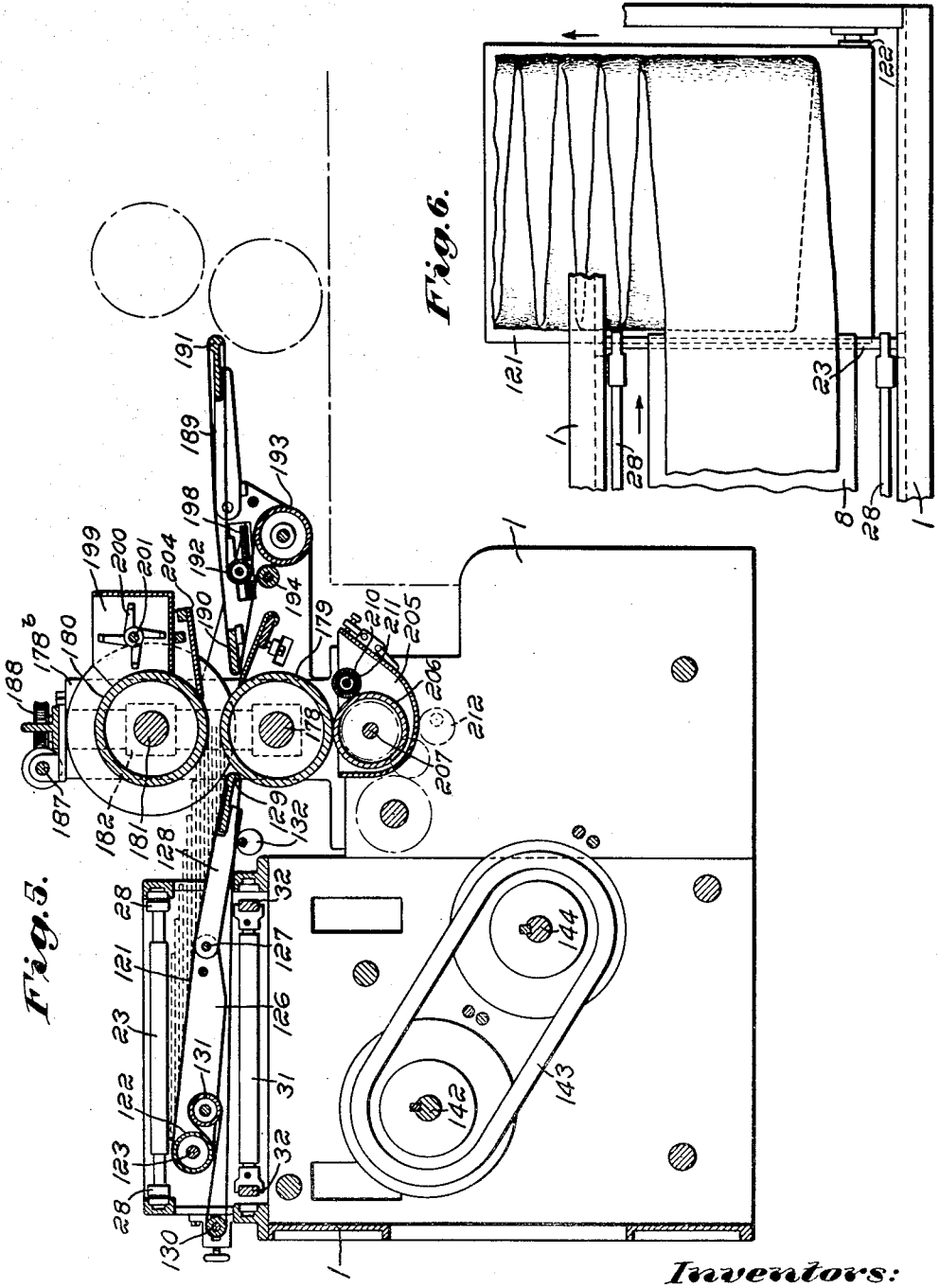
Inventors:
Thomas L. Green,
Charles H. Williams, July 19, 1932. T. L. GREEN ET AL 1,868,317
METHOD AND MACHINE FOR SHEETING AND FOLDING PLASTIC MATERIALS
Filed May 10, 1929 11 Sheets-Sheet 6

Inventors:
Thomas L. Green,
Charles H. Williams,
by
Attys.

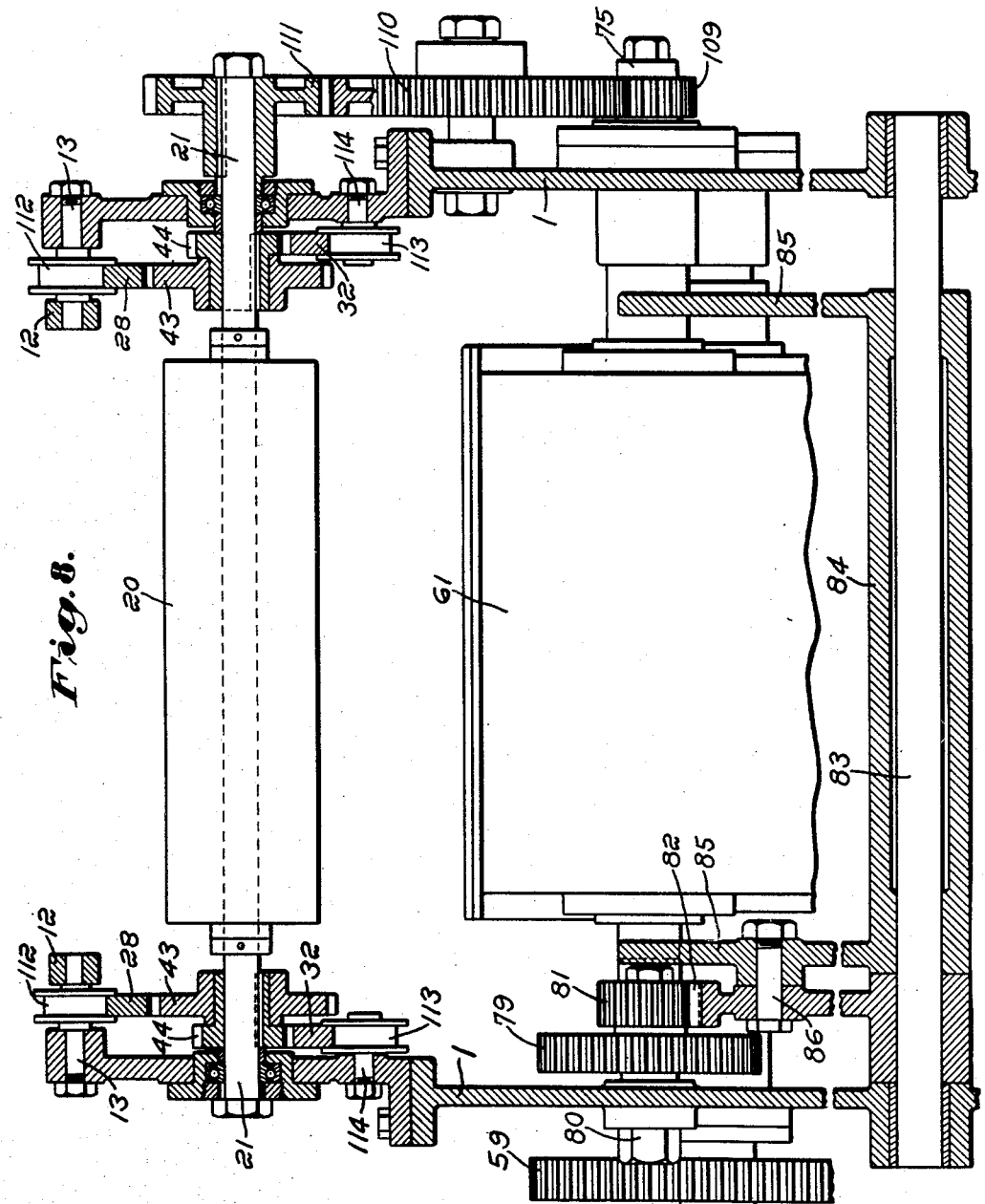

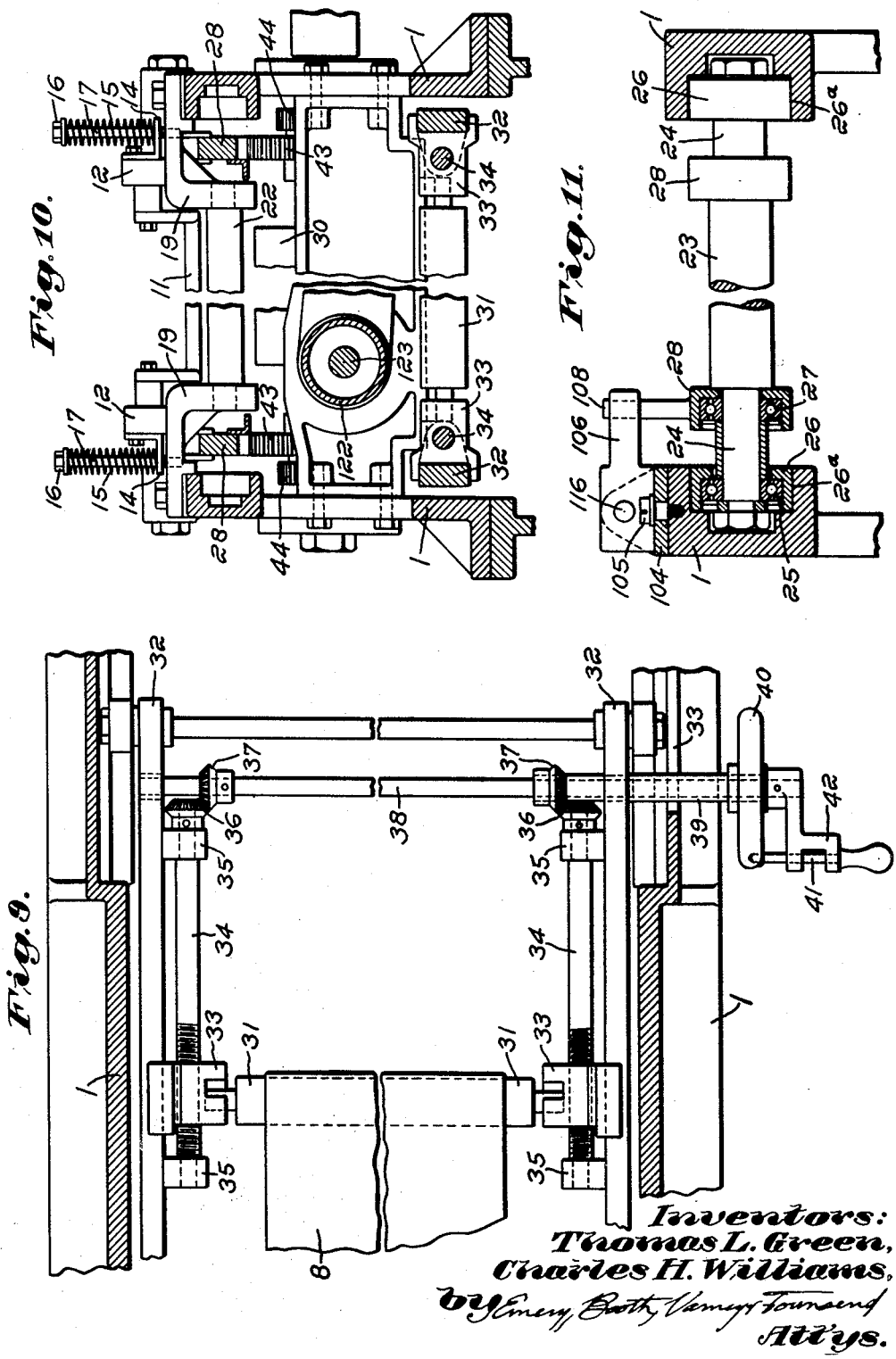

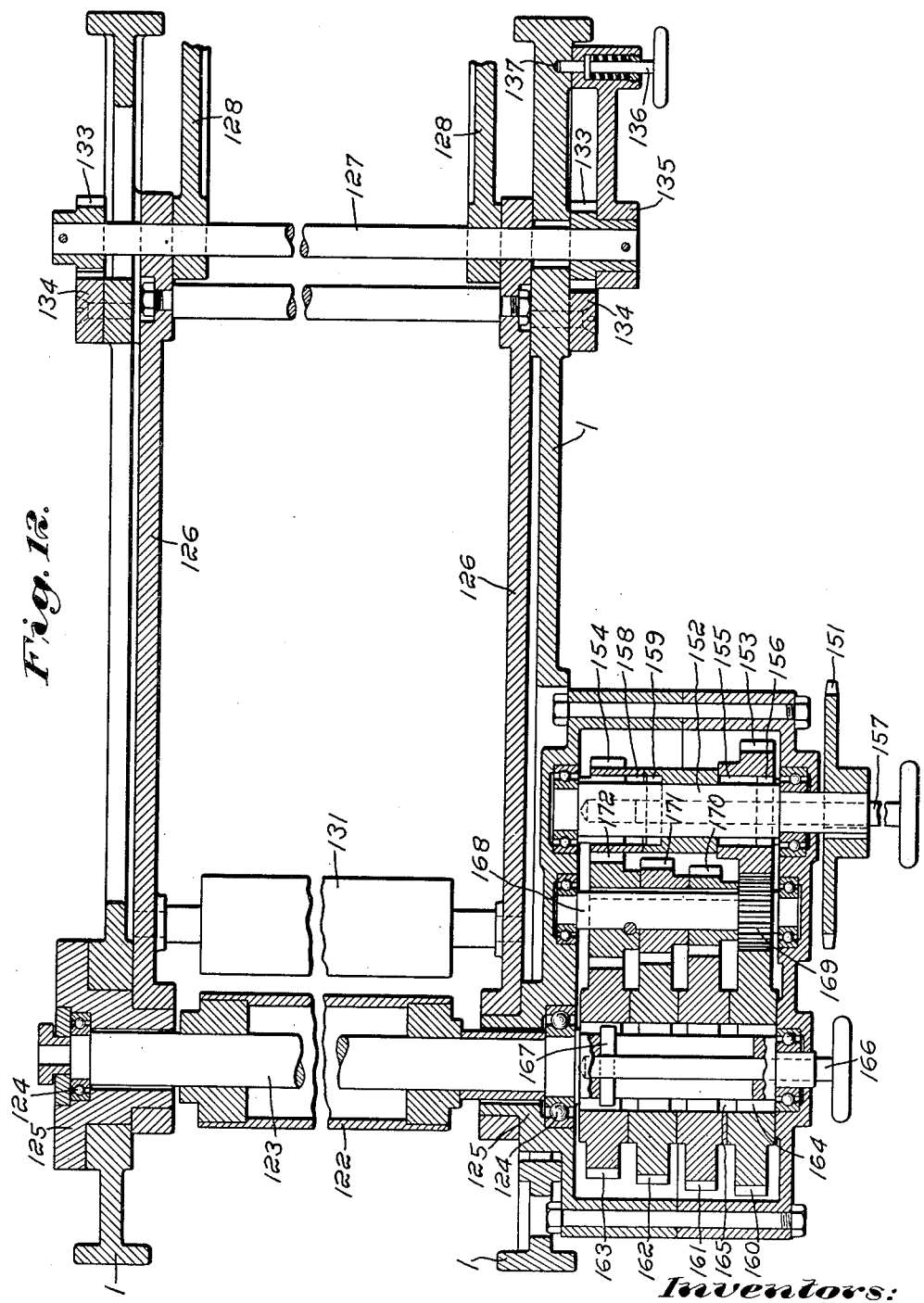

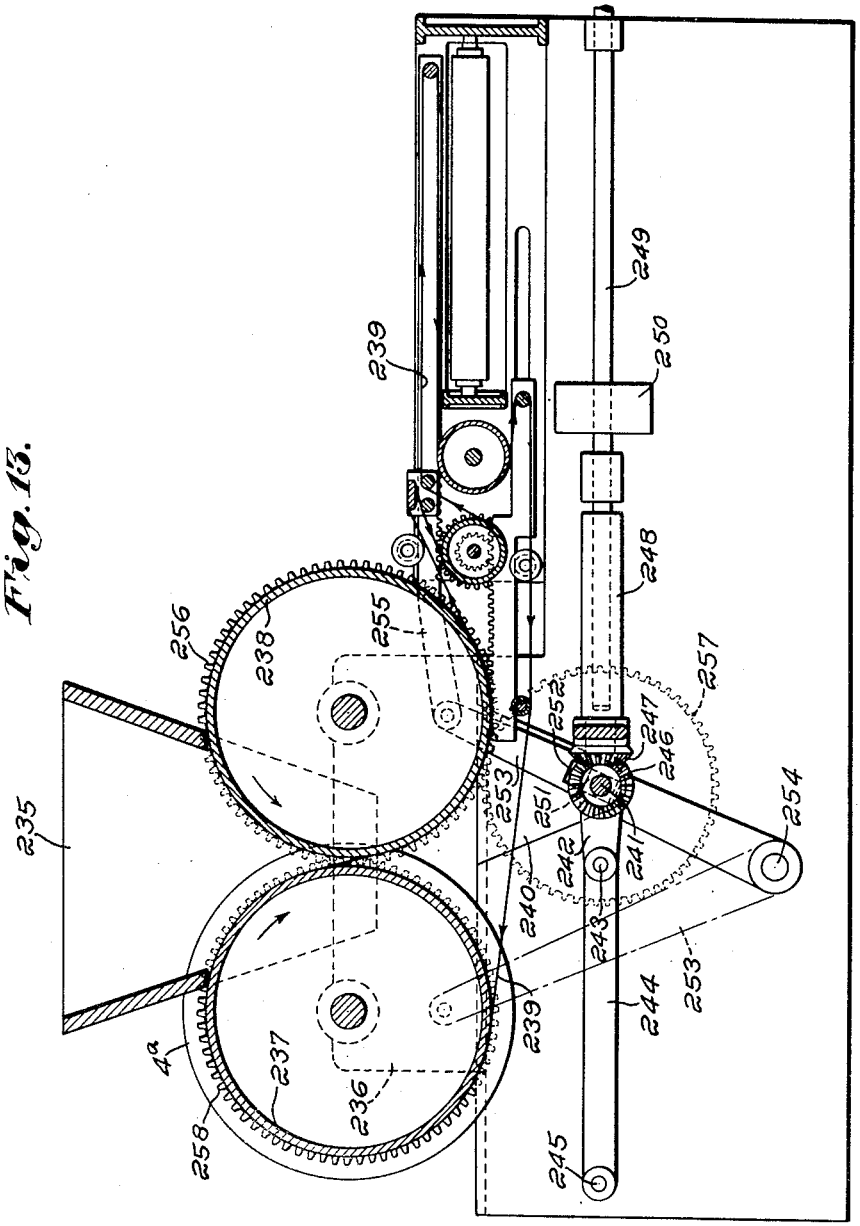

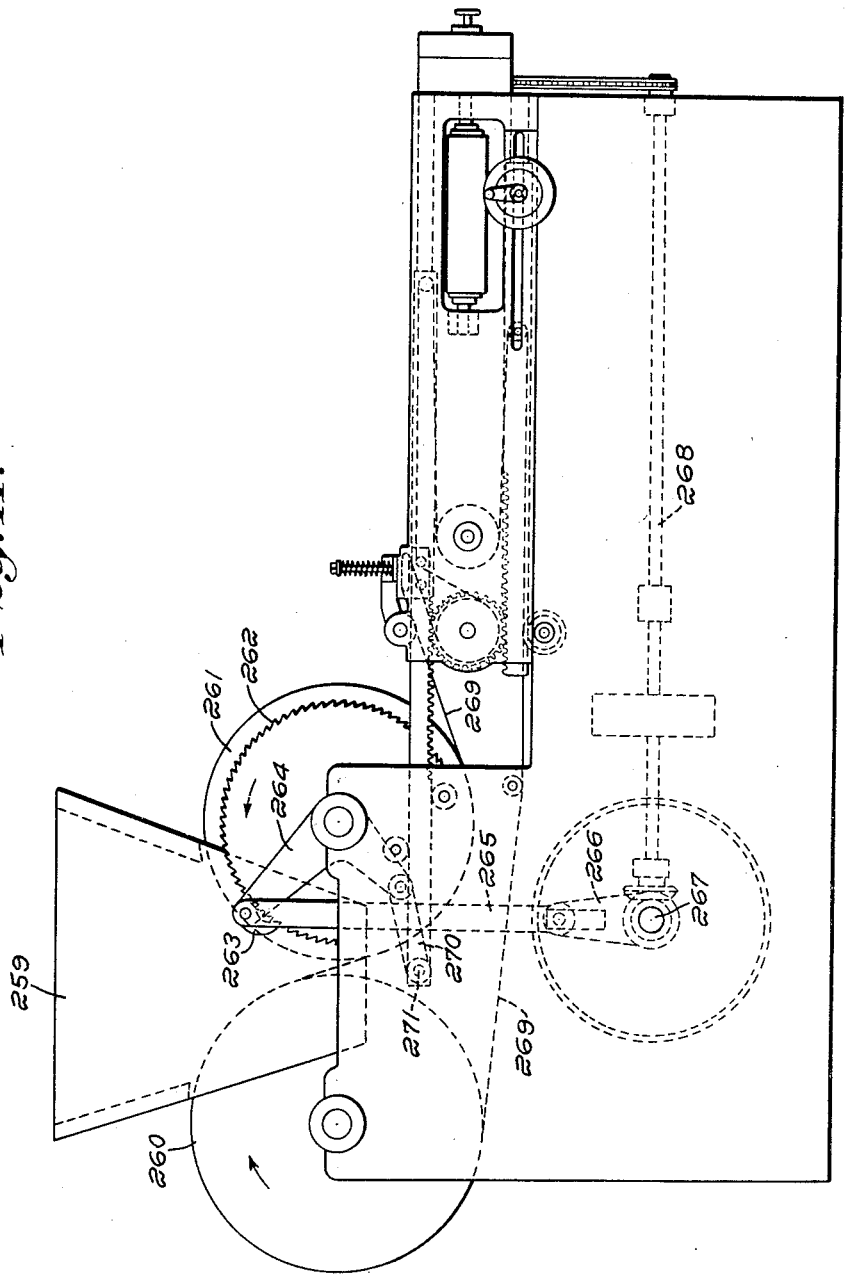

Patented July 19, 1932

1,868,317

UNITED STATES PATENT OFFICE

THOMAS LUTHER GREEN AND CHARLES HERBERT WILLIAMS, OF INDIANAPOLIS, INDIANA; SAID WILLIAMS ASSIGNOR TO SAID GREEN

METHOD AND MACHINE FOR SHEETING AND FOLDING PLASTIC MATERIALS

Application filed May 10, 1929. Serial No. 361,928.

Our invention aims to produce a novel and improved machine for sheeting and folding plastic materials such, for example, as dough used in the making of various bakers' products.

The present improvements are directed largely to a machine that will handle the plastic material in sheet form with the least possible tendency to undue disruptive stresses, and that will preserve to the largest degree possible uniform, desired width, thickness and density of the dough sheet.

Our invention will be best understood from a description of a specific embodiment thereof, illustrated in the accompanying drawings, wherein:

Fig. 1 is a front elevation of such an illustrative machine;

Fig. 2 is a right hand end elevation of the same machine;

Fig. 3 is the top or plan view of the machine shown in Figs. 1 and 2;

Fig. 4 is a vertical longitudinal section on a broken line 4—4, Fig. 3, looking upward;

Fig. 5 is a vertical cross-section on the broken line 5—5, Fig. 3, looking toward the left;

Fig. 6 is a detail illustrating the manner of folding the sheet material upon the receiving apron, as it will appear when deposited upon said apron at the right, Fig. 3;

Fig. 8 is an enlarged cross-sectional detail on the irregular broken line 8—8, Fig. 1, looking to the left;

Fig. 9 is a further horizontal sectional detail on an enlarged scale, the section being taken on the broken line 9—9, Fig. 1, looking down;

Fig. 10 is a vertical cross-sectional detail on the broken line 10—10, Fig. 4, looking to the left, also on an enlarged scale;

Fig. 11 is a further vertical cross-sectional detail on the broken line 11—11, Fig. 4, looking to the left, also on an enlarged scale;

Fig. 12 is a horizontal sectional detail taken on the broken line 12—12, Fig. 2, looking downward, the same being on an enlarged scale; and Figs. 13 and 14 are vertical sectional views illustrating modifications to be referred to.

Figure 7:
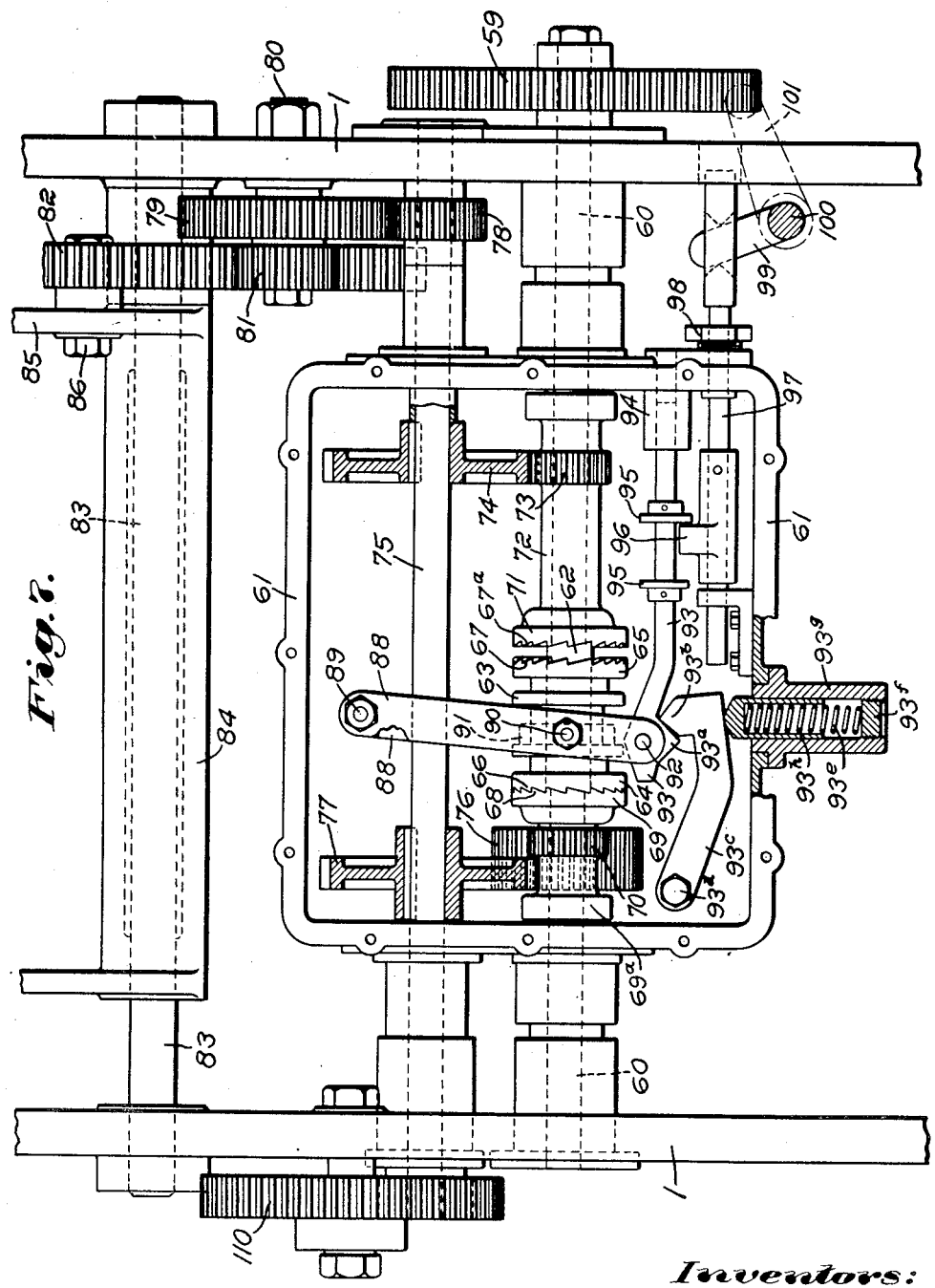
Fig. 7 is an enlarged sectional detail on the broken line 7—7, Fig. 1, looking downward.

In the illustrative embodiment of our invention shown in the drawings, the frame, of generally box-like construction, is indicated at 1, and is provided at its upper left hand end with a hopper 2, into which the dough or other plastic material that is to be handled is deposited in convenient form. In the further description of the machine, it will be assumed that dough is being handled, but it is to be understood that the invention is not restricted to use with any particular plastic material.

Referring to Fig. 4, the hopper referred to is provided with one or more inwardly inclined walls, herein the left hand wall 3 being so inclined, to aid in delivering the material at the bottom or outlet thereof. In the present instance there are arranged at the bottom of the hopper, two horizontal feed rolls 4, 5, mounted respectively upon transverse shafts 6, 7, journaled at their ends in suitable bearings in the frame.

Extending partially about and in contact with the feed rolls 4, 5, is an endless, conveying apron 8, ordinarily of canvas, and covering the portion of the feed roll 4 that stands beneath the outlet end of the hopper, but not covering the corresponding portion of the opposite feed roll 5. Thus the outlet to the hopper is constituted and controlled by the smooth surface of the roller 5 and the fabric or apron overlying the roll 4. By causing the apron, which is to convey the sheet delivered from the hopper to the mechanism that is thereafter to act upon it, to constitute one side of the outlet to the hopper and one of the members to reduce the dough initially from bulk to sheet form, we cause the sheet dough to be so firmly or closely compacted against the apron surface, and between the apron and the feed roll 5, around which it passes, that the usual tendency of the dough sheet to recover or contract in the direction of its length as soon as released from the sheet forming rolls, is prevented, and the resultant lateral expansion and increased thickness of dough sheet is also and thereby eliminated. This insures delivery of the dough sheet to the subsequent mechanism much more uniformly with respect to width and thickness than has ever been possible heretofore.

The feed rolls are distinctly larger in diameter than it has heretofore been customary to make them, so as to present large converging areas of moving surfaces to act gradually to draw the dough into the converging space between them by a jaw-like or vise-like action of direct approach to and upon the dough lying between the same, thus to grip and advance the dough by an action of seizure, so to speak, as contrasted with a more strictly frictional contact, such as is presented by feed rolls of smaller diameter. The rolls of small diameter are more likely to slip in contact with the dough and by their contact burn or otherwise injure the dough. The avoidance of frictional slip and consequent liability to damage the dough, is further promoted by having the apron-covered feed roll at a lower level and further under the hopper than the uncovered roll, the entire arrangement being such as to provide a superior feed, more certain in its action and less likely to injure the dough. One at least of the feed rolls, herein the roll 4, is provided with a flange 4ª to prevent the mass of dough, when reduced to sheet form, from spreading unduly over one or both ends of the roll or the apron thereon.

The apron 8, after leaving the feed roll 5 at the right hand side of the latter, Fig. 4, is passed over and partially about a take-up roller 9, journaled in the outer ends of a pair of arms 10 loosely mounted upon the ends of the roll shaft 7. The arms carrying the take-up roller 9 are caused to oscillate from their full-line position of Fig. 4 to their dotted line positions, about the axis of the feed roll 5, by mechanism to be later described.

From the take-up roller 9, the apron 8 is carried upward to the right, over and about a transverse bar 11. This bar is suspended between two arms 12 overlying the frame and fulcrumed at 13 thereon. Referring to Fig. 10, these arms 12 at their free ends are provided with outwardly extended ears 14 seated upon springs 15 bearing at their upper ends against the under sides of nuts 16 on the vertical rods 17, which are extended through said ears and are tapped into the frame or brackets secured thereto. These springs maintain the bar 11 yieldingly in its lowermost position, with its supporting arms seated upon the frame directly or through the medium of adjusting set screws not shown.

From the bar 11 the apron 8 is returned to the left, Fig. 4, over a guide roller 18 journaled at its ends, see Fig. 10, in the inwardly depending ends of two brackets 19, mounted on the frame, thence to and about a transverse roller 20 loosely journaled upon the transverse shaft 21 mounted in the frame.

From the roller 20, Fig. 4, the apron is carried upward and over a second roller 22, arranged parallel with the roller 18, and journaled in the same brackets therewith, thence said apron is extended to the right, Fig. 4, to and is looped about a reciprocatory delivery loop roller 23.

This loop roller, see Fig. 11, has its reduced end journals 24 supported in ball bearings 25 within the rollers 26 that run in tracks 26a provided therefor in the frame. The journals 24 also carry ball bearings 27, which support the horizontal racks 28, that are slidable thereon relative to the frame, and which will be hereinafter referred to more in detail.

From the loop roller 23 the apron 8 is carried back to the left, Fig. 4, to and about the idler roller 30 journaled at its ends in the frame, thence is carried forward to the right, Fig. 4, to and about a compensating loop roller 31 journaled at its ends in other racks 32, mounted to reciprocate in and relative to the frame.

The compensating roller 31, while carried by the racks 32 and reciprocable with them, is not mounted in bearings directly in said racks but, see Fig. 9, is journaled in two boxes 33, which embrace and are carried by the said racks and are adjustable longitudinally thereon.

Through these journal boxes 33 are extended the threaded portions of two adjusting screws 34, supported at their ends in lugs 35 upon the inner faces of the racks; by turning these adjusting screws, the journal boxes may be adjusted on and with relation to the racks to adjust or take up the slack in the apron 8.

For convenience of operation, the adjusting screws 34 at their right hand ends, Fig. 9, are provided with beveled pinions 36 in mesh with the oppositely facing beveled pinions 37 on the transverse shaft 38, journaled at its ends in the racks. The pinion 37, which is nearest the front of the machine—at the bottom, Fig. 9—is not mounted directly upon its shaft 38, but upon a sleeve 39 surrounding said shaft, and is provided at its front end with a hand wheel 40. The rim of this wheel is provided at its outer face with a series of recesses to receive the inner end of a spring controlled locking pin 41 carried in the outer end of an arm 42 fast on the projecting end of the shaft 38. This pin locks the shaft 38, its wheel and the sleeve 39 together, so that in turning either one, the other turns as a unit with it. The two may conveniently be turned by utilizing the head of the pin 41 as a crank handle and, when so turned, cause simultaneous but opposite rotation of the adjusting screws 34, thereby to move the journal boxes of the loop roller 31 in either direction as desired for proper adjustment of the apron 8. By withdrawing the spring controlled pin 41, the crank 42 and the wheel 40 may be relatively turned or adjusted to move one journal box 33 relative to the other, for varying the alignment of the roller within the loop of the apron, thus to make possible at all times an equal tension at both edges of the apron.

Referring to Figs. 4 and 8, the two pairs of reciprocating racks 28 and 32 are provided along their facing edges with gear teeth which mesh respectively with the connecting gears 43, 44, the gear 43 being twice the diameter of the gear 44, both being fast upon the shaft 21, upon which the roller 20 is journaled. Rotation of the shaft 21 carrying the gears 43, 44, operates through said gears simultaneously to reciprocate the upper racks 28 and the lower racks 32, but the upper racks will in every instance move in an opposite direction from that in which the lower racks will move, and at twice the speed and consequently through twice the distance, due to the difference in diameter of the gears. Thus, when the upper racks are moved to the right, Fig. 4, to extend the delivery loop 23 of the apron, the lower racks will move simultaneously to the left to cause the compensating loop roller 31 to give up a portion of the apron length necessary to permit such movement, and when the upper racks are moved to the left to shorten the delivery loop, the lower racks will move simultaneously to the right to extend the compensating loop roller 31, and so take up a part of the resultant apron length.

From the compensating loop roller 31, the apron 8 is extended to the left over the idler roller 45, thence down to and beneath the roller 46, thence to and about the feed roller 4 to the point of beginning.

Thus the apron which forms one side of the feeding and sheet forming exit of the hopper, is carried under and beneath the feed roll 5, thence up and over the take-up roller 9, thence to and about the yieldingly supported bar 11, and is returned thence to and about the roller 20, which may be, and preferably is, a skeleton roller. From the skeleton roller 20, the apron is carried again forward to and over the roller 22 in the frame, thence to the right to and about the delivery loop roller 23, and backward to and about the stationary roller 30. From the stationary roller 30, said apron is carried again forward or to the right, to and about the lower compensating loop forming roller 31, thence back to the left over and under respectively the rollers 45, 46, to the point of beginning.

This advancing and receding, or to and fro, movement of the delivery loop 23, causes the dough sheet carried thereon to be fed off from the end of said loop and to be deposited in folds upon and crosswise to a transversely traveling receiving apron to be described. The folds are laid upon the receiving apron in manner shown in Fig. 6. The relative speeds at which the delivery and receiving aprons travel determine the number of folds deposited upon the receiving apron in any given unit of travel of the latter or, for example, while the latter is traveling a distance equal to the width of the dough sheet.

If the rate of travel of the receiving apron is relatively high, fewer folds will be superposed upon said apron while the latter is traveling a distance equal to the width of the dough sheet, and if the rate of travel of the receiving apron is relatively low, then more transverse folds will be superposed upon said apron while traveling the same distance.

Referring to Fig. 1, the feed rolls 4 and 5 are geared together by two inter-meshing gears 47, 48, on the shaft 7 of the feed roll 5. The shaft 7, upon which the roll gear 48 is mounted, carries also at the back side of the machine a larger gear 49 which, in turn, is driven at its under side by a pinion 50 on the transverse shaft 51 journaled in the frame. This shaft 51 carries at the front side of the machine a large gear wheel 52, which is driven by a small pinion 53 on the drive shaft 54 of a suitable variable speed transmission, herein indicated as of the well known Lewellen type. Such a variable speed transmission, see Fig. 4, includes a pair of facing frustro-conical disks 55 connected by a belt 56 with a similar pair of frustro-conical disks 57 mounted on the drive shaft 58 of the transmission. In the machine shown, the shaft 58 is the main driving shaft of the machine, and is provided at its rear end, Fig. 1, with suitable driving pulleys, or it may be connected with an electric or other motor.

Through the variable speed transmission described, the gearing leading to the feed rolls 4, 5, and to the rack driving and loop forming means, may be operated at any desired speed.

The apron take-up roller 9 has been referred to; the means for actuating it is as follows:—Referring to Fig. 1, the gear 52 meshes with and drives a smaller gear 59 fast on a transverse shaft 60 journaled in the frame, which shaft, see Fig. 7, constitutes the drive shaft of a reversing transmission, arranged within the box 61.

Referring still to Fig. 7, the drive shaft 60 of the reversing gear, at a point intermediate its length, is squared as indicated at 62, and upon this squared portion is mounted the slidable sleeve 63 provided at its ends with heads 64, 65. These heads at their outer faces are provided with ratchet teeth 66, 67, the teeth on the respective heads facing in opposite directions. The ratchet teeth 66 are adapted to engage cooperating ratchet teeth 68 on the head 69 of a sleeve 69ª, loosely mounted upon the cylindrical portion of the drive shaft 60, and carrying fast with it a pinion 70.

The ratchet teeth 67 upon the opposite head 65 are adapted to engage corresponding teeth 67ª upon the head 71, fast upon one end of a sleeve 72 loosely mounted upon the cylindrical part of said drive shaft 60, and provided at or near its opposite end with a pinion 73.

The pinion 73 meshes with a larger gear 74 fast upon the driven shaft 75 of the reversing gear, which shaft is mounted in suitable bearings in the frame externally of the gear box. The pinion 70 meshes with an intermediate gear 76, shown at the left, Fig. 7, which latter is also in mesh with and drives the gear 77, likewise fast upon said driven shaft 75.

When the sliding sleeve 63 that is mounted upon the squared portion of the drive shaft 60 is moved to the left, as shown in Fig. 7, with its ratchet teeth 66 engaging their cooperating teeth upon the head 67, rotation of the drive shaft 60 will operate through the intermediate gear 76 to rotate the gear 77 and the driven shaft 75 in the same direction. If, however, said sleeves 63 be slid to the right along its squared shaft, to bring its ratchet teeth 67 into engagement with the corresponding ratchet teeth on the head 71 of the sleeve 72, rotation of said drive shaft in the same direction as before will cause the pinion 73 to rotate its gear 74 and the driven shaft 75, upon which the latter is mounted, in an opposite direction from that in which the drive shaft rotates. Thus by sliding the sleeve 63 on the squared portion of the shaft into one or another of its extreme positions, rotation of the drive shaft 60, always in one direction, will rotate the driven shaft 75 alternately in opposite directions. The gears are always in mesh with each other, but because the pinions 70 and 73 are mounted on sleeves loosely mounted on the drive shaft, when either set of gears is availed of to drive the shaft 75, the other set rotates idly upon their respective shafts.

Referring now to Fig. 1, the driven shaft 75 of the reverse gear is provided with a pinion 78, shown in dotted lines, Fig. 1, and in full lines at the right, Fig. 7. This pinion 78 drives a gear 79, also shown in dotted lines, Fig. 1, loosely mounted upon a stud 80, Fig. 7, projecting inwardly from the front side of the frame. Fixedly connected to and at the side of the gear 79 is a pinion 81, which drives the segmental gear or quadrant 82, Fig. 1, fast upon the shaft 83 journaled in the frame, and extending through from one to the other side thereof. Loosely mounted upon this shaft 83, see Fig. 8, is a sleeve 84, provided at its ends with two upstanding elbow arms 85, Fig. 4, one of which, see Figs. 1 and 8, is secured by a bolt 86 to the quadrant gear 82, so that as said quadrant gear is oscillated by the reverse gear, Fig. 7, it will correspondingly oscillate or rock the elbow levers 85, the latter being jointed by connecting rods 87, Fig. 4, to the outer ends of the arms 10, between which is mounted the takeup roller 9 hereinbefore referred to.

Thus rotation of the driven shaft 75, Fig. 7, of the reverse gear alternately in one or the other direction, will operate, through the quadrant gear 82 and the connecting rods 87, to oscillate the takeup roller from its full line position, Fig. 4, to the dotted position in the same figure, to take up slack in the apron 8 that would be otherwise produced by the continuous rotation of the feed rolls 4, 5, during inward or return movement of the loop carrying roller 23, and to give up apron to said loop forming roller 23 during and to permit its outward movement.

The reverse gear described is operated to produce the alternate forward and reverse movements of the rack driving gears 43, 44, and of the takeup roller 9 by means shown in Fig. 7. Within the reverse gear box are two levers 88 fulcrumed at 89 and straddling the shaft 75, said levers extending to and spanning the sliding ratchet-toothed sleeve 63. Each of said levers has pivoted thereto at 90 a segmental yoke 91 that partially embraces said sleeve between the ring-like portions shown thereon. The space between said ring-like portions is wider than the width of the yokes 91, so that as the levers 88 are swung from left to right, and vice versa, the lost motion between the yokes 91 and the end rings at either side thereof will permit said levers to move slightly past their mid positions before the yokes will strike the end ring at the opposite side and shift the sleeve to disengage the ratchet teeth at one side, and to engage those at the opposite side.

The free ends of the levers 88 are themselves connected by a pin 92 which extends through a transverse slot in the free end of an actuating slide rod 93 mounted at its right hand end to slide in a boss 94 on the inner face of the gear box wall.

Near its middle, the actuating rod 93 is provided with a pair of fixed collars 95 that receive between them an actuating lug 96, the hub of which is fast upon a slide rod 97 mounted to slide endwise in bearings on the inner face of the gear box. This slide rod 97 protrudes through to the outside of the gear box, passing through a suitable stuffing box 98 to prevent escape of lubricant from the gear box. Said rod 97 at its outer end has a head provided with an opening with beveled end walls, which opening receives an arm 99 upon the lower end of a vertical shaft 100. To the upper end of this shaft 100 is secured a bell crank arm 101, see Fig. 3, and to the outer end of said arm 101, see Figs. 1 and 3, is connected a longitudinal rod 102, which at its opposite end at the right, is jointed at 103 to a slide 104 on the machine frame. Referring to the detail, Fig. 11, the slide is shown slidably mounted upon the top of the frame, being there held by the cap screws 105. This slide is provided with two laterally extended tappet fingers 106, 107, see Fig. 3, between which stands a stud 108 on one of the upper racks 28.

When, in the reciprocation of said racks, the stud 108 meets one of the tappet fingers 106, 107, it will carry along with it the slide 104 and, through the rod 102, rock the vertical shaft 100 in one or the other direction. This will move the actuating rod 93 of the reverse gear in one direction to engage the ratchet teeth at one end of the reversing sleeve, to oscillate the quadrant 82 in one direction and, upon the reverse movement of the rack, when it meets the other of said fingers, will move said slide 104 in the opposite direction and, through the described mechanism, shift the ratchet-toothed sleeve in the opposite direction. In this manner the reciprocation of the rack 28 operates to shift the ratchet toothed sleeve of the reverse gear box at the proper time and in the proper direction, to cause reversal of the driven shaft 75 and oscillation of the takeup roller carrying arms.

Referring to Fig. 7, upon the end of a rod 93 is a depending V-shape lug 93$^a$, with which cooperates a Λ-shape lug 93$^b$, on the end of a throw lever 93$^c$, fulcrumed at 93$^d$ on the gear box wall. This throw lever 93$^c$ is pressed yieldingly upward by a spring 93$^e$ seated on the adjustable plug 93$^f$ of a spring socket 93$^g$. A cap 93$^h$ enclosing the free end of the spring has its conical end underlying the other lever to lift the latter.

When the slide rod 93 is moved from one toward the other of its extreme positions, its V-shape lug 93$^a$ depresses the Λ-shape lug 93$^b$ and its throw lever until the lug 93$^a$ has passed mid-throw position, whereupon the Λ-shaped lug 93$^b$ on the throw lever, actuated by a spring 93$^e$, will complete the balance of the movement of said rod 93 by a quick and positive throw, taking up the lost motion between the heads of the sliding sleeves 63 and shifting the rod 93.

Thus, in effect, the tappet actuated vertical shaft 100 initiates the throw of the rod 93 and the spring-actuated throw lever 93$^c$ completes the movement.

Referring to Fig. 8, the driven shaft 75 is extended at the right through the wall of the gear box and through the frame adjacent thereto and, outside the frame, is provided with a pinion 109, which meshes with a larger intermediate gear 110, loosely mounted on a stud on the frame. Said gear 110, in turn, engages at its upper side a small gear 111 fast on one end of the shaft 21, which is the shaft upon which the rack gears 43, 44, are made fast, and upon which the loop roller 20 is loosely mounted.

Thus when the ratchet sleeve of the reverse gear is automatically shifted by the movement of the rack 28, the said reverse gear mechanism operates to reverse the driving gears 43, 44, to reverse the travel of the racks and the apron loops carried thereby, simultaneously with reversal of the movement of the takeup roller 9, to accommodate the reciprocations of the delivery loop 23.

Referring to Fig. 8, it will now be clear how the racks 28 are supported at their ends from which they are driver. Said racks rest upon the gears 43, by which they are driven, and, overlying the racks, are grooved wheels 112 loosely mounted upon studs 13 previously referred to as the studs upon which the short rams 12, Fig. 4, are mounted that carry the yieldingly supported bar 11, about which the apron 8 is extended.

The grooved wheels 112 hold the racks down in proper operative engagement with the rack-operating gears 43.

Similarly, the racks 32 are in toothed engagement at their upper sides with the gears 44, and are so held by the underlying grooved wheels 113 loosely mounted upon studs 114 carried by the frame.

Referring now to Figs. 1 and 3, the tappet fingers 106, 107, while operatively fixed to the slide 104, are nevertheless adjustably mounted thereon in the following manner:— Upon the slide 104 are two upstanding bosses 115, in which is mounted an adjusting rod 116, held against endwise movement on the slide and having its right and left hand threaded ends in threaded engagement with said tappet fingers, so that rotation of said rod 116 will cause the tappet fingers thereon to be adjusted toward and from each other. This varies the space between the tappet fingers and therefore the distance through which the stud 108 will travel in either direction before engaging one of the tappet fingers to move the slide 104, and through the mechanism described cause reversal of the driving mechanism.

For convenient rotation of the adjusting rod 116 and resultant adjustment of the tappet fingers, we have provided the said rod near its middle, see Fig. 3, with a worm gear 117, with which meshes the worm 118 on the short shaft of the hand wheel 119. By turning this hand wheel in one or the other direction, said rod 116 will be correspondingly rotated and, through the opposite threads at its ends, will cause necessary and fine adjustment of the tappet fingers 106, 107, as described. This adjusting means is self-locking.

Adjustment of the length of the actuating rod 102 by the turnbuckle 120 serves to position the tappet fingers without varying the spacing between them, as may be necessary to centralize the dough sheet folds deposited upon the receiving apron; and adjustment of the space between the tappet fingers, to or from each other, serves to vary the length of reciprocation of the racks and the oscillations of the takeup roller 9 to fit the particular width of dough sheet for the time being operated upon.

Correction or adjustment for centralizing the folds of the dough upon the receiving apron is made necessary by the variation in fold of a dough sheet of one consistency, as compared with that of a different consistency. For example, a thin and flexible dough sheet is capable of being folded sharply and at the instant of reversal, whereas a heavier and stiffer dough sheet will fold more slowly and require a larger turn or bend in making the fold, either due to greater thickness or greater stiffness. The heavier and stiffer sheets tends to crowd or jam between the lower strand of the apron delivery loop and the transverse receiving apron beneath it, and tends also to crowd ahead with the advancing loop, so as to throw the entire sheet of folds out of center. These tendencies may be offset by the centralizing adjustment referred to.

Adjustment of the tappet fingers 106, 107, to or from each other, is required to accommodate dough sheets of different consistencies and of different widths. For example, if the mass of folds be very thick, that is to say, contains a large number of superposed layers or laminations, it will be squeezed out laterally in the final rolling much more than would a thinner mass, perhaps of fewer folds, consequently when a large number of superposed folds are employed, producing a thick mass prior to rolling, the folds must be shortened to produce a narrower pile, otherwise the spread of the same in final rolling would cause the edges of the sheet to crowd against the flanges of the rolls and possibly damage the dough by undue compression and heating in the vicinity of the edges of the sheet.

Taking up now the progress of the folded dough sheet, said sheet is delivered in the form of transverse folds upon a transversely moving receiving apron heretofore mentioned and now identified by the reference number 121, Fig. 5. This receiving apron is endless and is supported at the left upon and about a drive roller 122 fast on a shaft 123 journaled in the frame. The axis of the shaft 123 is parallel with the direction of travel of the apron 8, consequently the direction of travel of the receiving apron 121 is at right angles to that of the apron 8.

Referring now to Fig. 12, the shaft 123 is mounted in ball bearings 124 in the housings 125, and these housings, within the frame, are provided with trunnion bearings upon which are mounted one of the ends of the frame arms 126, which extend to the right, and carry at their ends a shaft 127 on which, between said arms 126, are mounted one of the ends of two additional arms 128. These additional arms 128 at their extreme ends, Fig. 5, are connected by a transverse bar 129, about which the apron 121 is passed, said apron being then led back beneath said arms 128, 126, to and about the takeup roller 130, thence forward or to the right to and about the idler roller 131, journaled in the frame arms 126, thence rearward again to and under said roller 122 to the point of beginning. Thus the frames 126, 128, hold the apron 121 in longitudinally extended position which, as shown in Fig. 5, is in a downwardly inclined direction.

At its free end, at the right, Fig. 5, this two-part jointed supporting frame for the apron 121 rests upon an adjusting eccentric support 132, by which the level of the delivery end of the apron at the loop bar 129 may be varied as desired.

The downward pitch or inclination of that portion of the apron 121 which underlies the delivery loop of the apron 8, is determined by adjustment of the two parts of the frame at the knuckle or joint 127. This adjustment is effected in suitable manner, as by the means shown in Fig. 12. Referring to this figure, the knuckle shafts 127 has fast thereon at its opposite ends pinions 133, which mesh with the short, nearly vertical, stationary racks 134 secured to the frame, as shown in Fig. 2. Also fast on the end of the knuckle shaft 127 is the hub of an arm 135, which carries at its outer end a spring-controlled button pin 136, the inner end of which engages one or another of a segmental series of recesses 137.

By withdrawing the spring controlled pin 136 from its recesses and turning the arm 135 in one or the other direction, the pinions 133 on the knuckle shaft 127 will be turned in and along thin vertical racks 134 to raise or lower said knuckle shaft, and thereby raise or lower the apron at that point, and thus change the pitch of the latter from its extreme left end, Fig. 5, to the knuckle, that is to say, throughout so much of its length as underlies the delivery apron 8.

This adjustment is desirable because as the reciprocations of the delivery loop 23 in the apron 8, to and fro across the receiving apron 121, lay the successive folds of dough thereon in the manner indicated in Fig. 6, said folds will in every instance after the initial fold, rest partly upon the folds immediately preceding and underlying it, and partly upon the receiving apron 121 itself. If said receiving apron 121 moved in a truly horizontal line, the result would be to leave the successive folds pitched in upwardly inclined positions thereon, and consequently obliquely with respect to the level of the dough sheet issuing from the reciprocating loop 23, which would put a twist into the dough sheet and tend to cause undue tension and breakage thereof.

By pitching the receiving apron 121 downward, as shown in Fig. 5, the successive folds in the dough sheet deposited in oblique positions thereon, in fact, rest in truly horizontal positions so that the folds in passing from the delivery apron to the receiving apron are subject to no twisting action whatsoever, and are therefore saved from rupture or other injury.

As the number of folds deposited upon the receiving apron is increased in a given unit of travel to increase the number of laminations or layers in any given space thereon, the obliquity with which they will stand upon the receiving apron will be increased, and conversely as the number of such folds deposited in a given distance upon the receiving apron is decreased, the flatter they will lie upon the receiving apron and the less the obliquity of the same, consequently the adjustment described for varying the pitch of the delivery apron is important, that such pitch may be adjusted in all instances so as to cause the layers or laminations of the dough sheet always to lie in truly horizontal lines upon the receiving apron and parallel with the transverse alignment of the dough sheet upon the delivery apron 8.

The eccentric adjustment at the free end of the knuckle frame 127, 128, is to bring the extreme delivery end of its apron at the desired level for proper delivery of the folded strip to whatever mechanism may be there placed to receive it.

To drive the delivery apron 121 through its roller 122, at the left, Fig. 5, we provide a variable speed transmission gear, best shown in Fig. 12, and this variable gear is in turn driven from the main drive shaft of the machine through the following mechanism: Referring to the bottom of Fig. 1, the driven shaft 54 has fast on its rear end a beveled pinion 138, shown also in Fig. 3, which drives a mating pinion 139 upon the short shaft 140 journaled in bearings in the frame. At its right hand end, Fig. 1, said shaft 140 is connected by a chain drive 141 with the drive shaft 142 of a variable speed transmission, conveniently another Lewellen gear connected by the transmission belt 143 with and to drive in variable manner the driven shaft 144. The drive shaft 142 of the Lewellen speed drive, see Fig. 2, is provided outside the frame with a pinion 145, which drives the intermediate gear 146 mounted on a stud carried by the frame. Fast upon the side of the gear 146 is a pinion 147, which drives a larger gear 148, also mounted upon a stud on the frame. This gear 148 has fast upon it a sprocket pinion 149 connected by a sprocket chain 150, with a sprocket wheel 151 on the drive shaft 152 of the variable speed transmission gear previously referred to.

The drive shaft 152 is mounted in suitable ball bearings in the gear box, see Fig. 12, and has loosely mounted thereon two gear wheels 153, 154. The wheel 153 is provided with two pairs of diametrically opposite keyways 155, which receive the ends of a transverse key 156 carried by a button shaft 157 mounted to slide axially within said shaft 152, said key projecting through and moving in diametrically opposite slots provided therefor in the enclosing shaft.

At the inner end the gear 154 is provided with two pairs of keyways 158 to receive the ends of a transverse key 159 mounted on the inner end of the button shaft and projecting through slots formed therefor in the hollow shaft 152.

Between the keyways 155 and 158, the hubs of the gears 153 and 154 are provided with annular neutral chambers, such that when the button shaft 157 is drawn to the front, as in full lines, Fig. 12, the ends of the key 156 will enter the keyways 155 in the gear 153 and lock the said gear to said shaft 152, in which position the key 159 at the inner end of the button shaft will be within the annular neutral chamber in the gear 154. If the button shaft be pushed inward, it will carry the key 156 into the neutral chamber adjacent thereto, and so disengage the shaft 152 from the gear 153, and at the same time, if the movement be sufficient, the key 159 will be carried into engagement with the keyways 158 in the inner pinion 154, to lock the latter to said shaft 152.

The annular neutral chambers are of such length axially of the shaft that the button shaft may be pushed from one extreme position, locking one of the gears, to an intermediate position, in which neither of the gears will be engaged, thence to a third position where the other gear will be engaged and locked to its shaft.

Still referring to Fig. 12, the driven shaft, at its outer end, is provided with a series of gears of different diameters marked 160, 161, 162, 163, and the hubs of these gears are respectively provided also with pairs of diametrically opposite keyways 164. Between the keyways of adjacent gears, there are annular neutral chambers 165. The end of the shaft 123 is drilled to receive the button shaft 166, which is provided at its inner end with a single transverse key 167, which projects at its ends through slots therefor in the tubular end of the shaft 123. As said button shaft is drawn from its innermost position, Fig. 12, toward or to its outermost position, its key 167 will successively lock the gears 163 to 161 inclusive to the shaft for operative rotation of the shaft thereby. When said button shaft is positioned at any of the points where its key 167 will stand in an annular chamber, none of the gears will be locked to the shaft.

Between the drive shaft 152 and the driven shaft 123, there is mounted an intermediate shaft 168, loosely journaled in bearings in the walls of the gear box and having fast thereon a series of gears 169, 170, 171, 172, of different diameters and in normal toothed engagement with the corresponding wheels 160 to 163 on the driven shaft 123. With the gears in the positions shown in Fig. 12, rotation of the drive shaft 152 by its sprocket wheel 151, will cause the gear 153, which is locked to said shaft, to drive its pinion 169, the shaft 168, the gear 172, and the gear 163, to transmit rotation to the driven shaft 123 and to the transverse receiving apron 121 at a given speed determined by the ratio of the gears engaged and operating. If the button shaft 156 be pushed inward to lock the driving shaft 152 to the gear 154, the latter, by engagement with the gear 172, will drive the gear 163 and the driven shaft 123 at a lower speed. Whichever gear, 153 or 154, the driving shaft may be made effective to drive, the motion eventually transmitted to the driven shaft 123, may be further varied by withdrawing the button shaft 166, to cause its key 167 to engage one or another of the gears 160 to 163 inclusive. The combination of gears is such that by various adjustment of the button shafts referred to, eight different rates of speed may be obtained for the driven shaft 123 from the driving shaft 152, providing a progressive adjustment of speed for driving the receiving apron 121.

At a given rate of travel of the delivery apron 8, the number of folds deposited on the receiving apron 121 while it is traveling a distance represented by the width of the dough sheet, may thus be varied at will, the slower the rate of travel of the receiving apron, the larger the number of folds deposited in the length of travel referred to, while the faster the said receiving apron travels, the fewer the number of folds superposed thereon.

Next we shall describe the re-rolling means which, in the present instance, acts upon the laminated or folded sheet delivered by and from the receiving apron 121.

Referring to Figs. 2 and 5, the variable speed driven shaft 144 is provided outside the end of the frame with a pinion gear 173, which drives the large gear wheel 174 fast on a long shaft 175, that extends through to the opposite side of the frame. At the rear, this shaft 175 is provided with a small pinion 176, which drives the large gear wheel 177. This gear 177 is mounted on the shaft 178 of the lower re-rolling roll 179, which shaft is journaled in boxes 178ª mounted in upstanding brackets 178ᵇ on the machine frame.

The upper re-rolling roll 180 is mounted upon a shaft 181, which latter is journaled at its ends in bearing boxes 182 adjustably mounted in said upstanding brackets 178ᵇ.

Fast on the outer end of the roll shaft 181 is a gear 183, which meshes with a like gear 184 on the shaft 178 of the lower roll, whereby the two re-rolling rolls are driven together in opposite directions at the same speed, the roll 180 being driven from and by a roll 179.

To adjust the boxes of the upper roll 180, we have provided adjusting screws 185, which engage the boxes 182 from above, and furnish means for positively moving the boxes downward or upward, the boxes carrying with them the upper roll 180. Springs 186 interposed between the boxes of the two rolls tend to separate the latter and take up slack in the adjusting screw. Suitable means is provided, such for instance as the transverse worm shaft 187, Fig. 5, with its worms engaging worm wheels 188 on the upper ends of the adjusting screws of the upper roll 180, to rotate said screws 185, thereby to determine the thickness of the re-rolled dough sheet issuing from the machine.

Referring to Fig. 5, when the re-rolled sheet issues from between the rollers 179, 180, it is deposited upon the endless traveling apron 189, passed about the frame supported bar 190 immediately back of the rollers 179, 180. This apron 189 is extended to the right to and about the transverse bar 191, also supported in an arm of the frame, thence back at a lower to and about the takeup roller 192, thence to the right again and about the driving roller 193 and over the idler roller 194, to the point of beginning at the bar 190. The driving roller 193, see Fig. 2, is driven through a sprocket wheel 195 by a sprocket chain 196 from a sprocket wheel 197 on the end of the roll shaft 178. The pitch diameter of the respective sprocket wheels 195 and 197 correspond to the diameters of the rollers to which they are fixed, so as to provide the correct surface speed for the traveling apron 189.

The takeup roller 192 is adjustable in convenient manner, as by the screws 198, Fig. 5, to maintain the apron 189 under proper tension and alignment.

Adjacent the top roll 180 is a box 199 containing an agitator 200 mounted upon a shaft 201 driven by gears 202, 203, from the roll shaft 181. Flour deposited in this box and stirred by the agitator 200, will be deposited upon the roll 180, to prevent the dough sheet sticking thereto. Beneath the duster box 199 is a scraper 204 of suitable construction, to assist in keeping the roll clean.

Below the bottom roll 179 is another duster box 205, in which is arranged a duster roller 206, shown as felt covered, mounted on a shaft 207 and driven by contact with said roll 179. This duster roll shaft 207 is provided outside the duster box 205, see Fig. 2, with a gear 208, which drives a pinion 209 on the end of a brush shaft 210, see Fig. 5, carrying a brush 211. Flour placed in the box 205 will be taken up by the felt roller 206, the surplus removed by the brush 211, and the remainder will be deposited upon the surface of the roll 179, to prevent the dough strip from sticking thereto.

By dropping the felt roller 206 from contact with the roll 179 and by arresting rotation of the agitator 200 in the duster box 199, said rolls 179 and 180 may rotate without surface dusting.

To this end, referring to Fig. 5, the felt roller may be raised and lowered by means such as the eccentric 212 which supports the journal boxes in which said roller runs.

At the right, Fig. 5, are indicated in dotted lines the feed rollers of the biscuit cutting or other machine which is to receive the re-rolled dough sheet from the apron 189.

Returning now to Fig. 1 at the hopper end of the machine, the shaft 6 upon which the feeding drum 4 is mounted, is supported by eccentric bearings 213, to permit said feed roll to be adjusted into varying degrees of proximity to its mating feed roll 5. These eccentric bearings may be adjusted in convenient manner, we having herein provided them with worm wheels 214, which are engaged by the worms 215 on the short shafts 216, suitably mounted on the frame. These shafts are rotatable through suitable bevel gearing not shown from the transverse shaft 217, provided at its front end with a hand wheel 218. Rotation of this hand wheel in one or the other direction will thus operate to turn the eccentric bearings in their supports, to carry the feed roll 4 nearer to or remove it farther from its mating roll 5, to obtain desired initial thickness of the dough sheet.

At the left, Fig. 4, we have provided a duster box 219 provided with an agitator 220 suitably driven, for dusting the surface of the apron 8 in its passage to the hopper outlet. Above the duster box is a rotary brush 221 journaled in the frame and driven, see Fig. 1, by a sprocket chain 222 from the shaft 51, to remove surplus dust material from the apron.

Above the feed roll 5, see Fig. 1, is another duster box 223, provided with a brush agitator 224, driven by a gear 225, in turn driven by a pinion 226 connected by a sprocket chain 227 with and to be driven by the shaft of the brush 221 referred to.

The shaft of the pinion 226 carries a toothed wheel 228, which drives a pinion 229 and its brush 230, see Fig. 4, to remove surplus dusting material from the feed roll 5.

The mass of dough deposited in the hopper 2 will be removed therefrom in the form of a sheet of desired thickness, determined by the relative positions of the feed rolls 4, 5. This dough sheet is carried around between the apron 8 and the feed rolls 5, and so is restrained from shortening with consequent widening and thickening, and by the time it reaches the takeup roll 9 and is freed from the grip between the apron and the roll 5, it will have become so firmly pressed upon and into the surface of the apron fabric that it will not thereafter slip or contract thereon. From the feed roll 5, said dough sheet is carried over the takeup roller 9 to the delivery loop 23, by which it is deposited, to and fro, in successive superposed folds upon the transversely-moving, pitched apron 121.

As the delivery loop 23 travels outward to the right, across the receiving apron 121, the continuously moving feed roll 5 and the downward swing of the takeup roller 9 combine to impart to the upper strand of the delivery loop a travel that is twice the speed of the advancing loop, that is, twice the speed of the advance of the delivery loop roller 23, with the result that notwitstanding the advance of the loop end, the dough sheet will outrun the same and will be fed off from the advancing loop and laid bottom side up on the receiving apron. The advancing apron loop passes progressively over the loop of dough sheet as the latter is laid upon the receiving apron.

When the apron loop 23 reaches the end of its advance across the receiving apron, its movement is reversed, and during its return travel the rising takeup roller 9 absorbs the apron feed imparted by the feed roll 5, so that the dough carrying strand of the loop and the dough sheet remain at rest, and the retreating loop roller, rolling from under the stationary apron and dough sheet, progressively shortens the loop and causes the dough sheet resting thereon progressively to drop or be laid, right side up, partially upon the dough sheet previously laid upside down upon the outward travel of the loop roller and partially upon the receiving apron, at the same speed at which it was laid during the outward travel of the loop.

During this return travel of the delivery loop, the opposite or advance travel of the compensating loop 31 and the continued rotation of the feed roll 4, combine to take up the slack in the apron that is contributed by the shortening of the delivery loop.

As stated, the variable speed drive 56 makes possible the control of the speed of the entire machine, to cooperate with any machine with which the machine described is to deliver its product.

Turning to the re-rolling of the deposited folds, shown in Fig. 5, the variable speed drive 143 there shown is provided to vary the speed of travel of the re-rolls 179, 180, and the related apron 189, to conform to the thickness of the re-rolled sheet. As the re-rolls 179, 180, are adjusted closer to each other to deliver a thinner sheet, the speed of rotation should be increased in relation to the supply of dough sheet delivered to the receiving apron; conversely, as said rolls are separated, the speed at which they are driven should be correspondingly reduced.

In Fig. 13 we have outlined in section a modified form of our invention, wherein the hopper 235 is mounted upon a frame 236 that is mounted to slide in suitable ways in the main frame of the machine. This sliding frame 236 also carries the feed rolls 237, 238, about which the delivery apron 239 is carried.

The sliding frame has depending brackets 240, in which is journaled the crank shaft 241. This shaft is provided with a crank 242, to the crank pin 243 of which is connected one end of the link 244, fulcrumed at 245 to the main frame. The crank shaft 241 is provided with a beveled gear wheel 246 driven by a mating wheel 247 of the sleeve 248, within which is splined the telescoping main shaft 249 provided with a drive pulley 250, which may be belted to a suitable source of power.

Upon the ends of the crank shaft 241 are bearing blocks 251, which slide in slots 252 in the levers 253, fulcrumed at their lower ends at 254 in the frame.

Rotation of the telescoping main shaft will act through the bevel gears referred to, to turn the crank shaft 241. As it turns, its crank 242, jointed to the link 244, will cause the shaft to receive a to and fro motion through a distance represented by the full throw of the crank, and thus will carry with it the sliding frame 236, its hopper and feed rolls, the latter and the hopper moving as a unit. The upper ends of the levers 253 are connected by short connecting rods 255 with the upper racks, which are in turn geared to lower racks, as with the machine illustrated in the principal figures of the drawings, the upper racks carrying the same reciprocatory delivery loop as in the construction of Figs. 1 to 12 inclusive.

The feed roll 238 is positively driven by a gear 256 thereon, represented in dotted lines, which is driven by a mating gear 257 fast on the crank shaft 241, and the feed roll 237 in turn is driven by a gear 258, which meshes with the same gear 256.

By making the hopper and its feed rolls, carrying one end of the endless apron 239, reciprocable as shown, the necessity for a takeup roller is avoided, the reciprocations of the feed rolls themselves furnishing the necessary takeup for maintaining proper tension at all times upon the apron in the presence of the to and fro movements of the delivery loop.

In the modification, Fig. 14, the hopper 259 is again stationary, as in the construction of Figs. 1 to 12 inclusive, and so also the feed rolls 260 and 261. In this modification, however, the necessity for a takeup such as the roller 9, Fig. 4, and for a takeup movement of the feed rolls as in the construction, Fig. 13, is obviated by giving to the feed rolls a step by step forward or feeding movement, so that upon the return or shortening movement of the delivery loop, when the dough sheet feed should be arrested at the loop, the entire feed of the dough sheet is for the time being arrested and, when the delivery loop advances across the receiving apron and should therefor have its maximum feed, the feed rolls at the hopper are given the necessary feeding movement.

This step by step feed is imparted by providing, for example, the feed roll 261 with a ratchet wheel 262 engaged by a pawl 263 on the pawl carrier 264, fulcrumed loosely upon the shaft of the feed roll 261. The pawl carrier is actuated by a connecting rod 265, connected at its lower end to and actuated by a crank 266 on the transverse shaft 267 journaled in the frame. This transverse shaft is driven by bevel gears from the longitudinal shaft 268 driven in the frame and receiving power from a suitable source not shown.

Rotation of the drive shaft causes the crank 266 by its turning movement to impart oscillatory movement to the pawl carrier 264, and to cause it through the pawl 263 to impart step by step movement to the feed roll 261, and through it by suitable gearing, as in the other constructions, to the mating feed roll 260.

The apron is shown at 269 and, in general, is laid as in the other constructions, over and about the delivery and compensating loops provided by the racks, excepting that in this figure the gearing connecting the two racks is not differential but direct, so that the lower racks receive the same length of movement as the upper racks. Movement is imparted to the racks by making the pawl carrier 264 as a bell crank, and connecting its lower arm by a short connecting rod 270 with the extended rear end of one of the upper racks, as at 271. The lengths of the step movement may be varied at will by adjusting the pin of the crank 266 radially in the crank.

Our invention is not limited to the embodiments shown, but may be varied as desired within the scope of the claims.

Claims.

1. A machine for handling plastic materials containing in combination a hopper, a continuously traveling sheet delivery apron, and means providing a reciprocatory delivery loop in said apron, said loop having an intermittently traveling-dough-carrying apron section.

2. A machine for handling plastic materials containing in combination a hopper, a continuously traveling sheet delivery apron, means providing a reciprocatory delivery loop in said apron having an intermittently traveling-dough-carrying apron section, and takeup means for said apron operating in conjunction with said reciprocatory loop.

3. A machine for handling plastic materials containing in combination, a continuously traveling sheet delivery apron, means providing a reciprocatory delivery loop in said apron and having an intermittently traveling dough-carrying apron section, and means providing a compensating reciprocatory loop also in said apron.

4. A machine for handling plastic materials containing in combination, a hopper, a continuously traveling sheet delivery apron, means providing a reciprocatory delivery loop in said apron, said loop having an intermittently traveling dough-carrying apron section, and also to and fro takeup means, both in said apron.

5. A machine for handling plastic materials containing in combination a hopper, a continuously traveling sheet delivery apron therefor, means for providing oppositely reciprocating loops in said apron, one traveling at a higher speed than the other, and takeup means for said apron.

6. A machine for handling plastic materials containing in combination a hopper, a continuously traveling sheet delivery apron therefor, means for providing oppositely reciprocating loops in said apron, one traveling at twice the speed of the other, and takeup means for said apron.

7. A machine for handling plastic materials containing in combination a hopper, a traveling apron therefor having a reciprocatory delivery loop, and a contact breaking reverse loop in the line of said traveling apron.

8. A machine for handling plastic materials containing in combination a hopper, a traveling apron having a reciprocatory delivery loop therein, a contact breaking reverse loop in said apron, and a skeleton loop roller for said reverse loop.

9. A machine for handling plastic materials containing in combination a continuously traveling receiving apron combined with a delivery apron, and means to cause a loop of the latter to have to and fro movement in the general direction of the length of the loop across said receiving apron.

10. A machine for handling plastic materials containing in combination a traveling receiving apron combined with a delivery apron, means to cause a loop thereof to have to and fro movement across said receiving apron, and means to cause said delivery apron to travel at a speed in excess of the movement of said loop in one direction and to be at rest during opposite movement of said loop.

11. A machine for handling plastic materials containing in combination a traveling receiving apron combined with a delivery apron, means to cause a loop thereof to have to and fro movement across said receiving apron, and means to cause said delivery apron to travel at double the speed of advancement of said loop in one direction and to be at rest during opposite movement of said loop.

12. A machine for handling plastic materials containing in combination with a traveling receiving apron and means to vary the rate of travel thereof, of a delivery apron, means to cause a loop thereof to have to and fro movement in the general direction of the length of the loop across said receiving apron, and means to cause the delivery apron to travel at double the speed of said loop in one direction, and to remain at rest during opposite movement of said loop.

13. A machine for handling plastic materials containing in combination with a traveling receiving apron of a delivery apron, means to cause a loop thereof to have a to and fro movement in the general direction of the length of the loop across said receiving apron to deposit the material of said delivery apron on said receiving apron in folded relation, means to cause variable movement of the receiving apron relative to the said delivery apron, and variably controlling the folded relation of the material deposited on said receiving apron and additional means to produce variable movement of both said delivery and said receiving aprons.

14. A machine for handling plastic materials containing in combination a traveling delivery apron, a traveling receiving apron, the line of travel whereof is pitched downward relative to the plane of said delivery apron by an amount determined by the thickness of the plastic sheet to be handled and means to cause a loop of said delivery apron to have to and fro movement across said receiving apron.

15. A machine for handling plastic materials containing in combination traveling delivery and receiving aprons, means to cause a loop of the former to have to and fro movement in the general direction of the length of the loop across the latter, and means to provide an adjustable pitch line of travel of the receiving apron relative to said delivery apron.

16. A machine for handling plastic materials containing in combination traveling delivery and receiving aprons, means to cause a loop of the former to have to and fro movement in the general direction of the length of the loop across the latter, means to provide an adjustable pitch line of travel of the receiving apron relative to said delivery apron, and a takeup loop in said receiving apron.

17. A machine for handling plastic materials containing in combination traveling delivery and receiving aprons, the latter having pitched alignment relative to the former, means to cause a loop of said former apron to have to and fro movement in the general direction of the length of the loop across said latter apron, and adjustable means to take up slack in said delivery apron.

18. A machine for handling plastic materials containing in combination with a hopper, feed rolls of large diameter relative thereto and presenting between them an outlet for said hopper, one of said feed rolls being at a lower level than and at one side of the other, and an endless apron furnishing the active surface for said last mentioned roll, the active face of the higher feed roll providing a nearly upright side wall to said hopper.

19. A machine for handling plastic materials containing in combination a hopper, an endless delivery apron to convey the contents therefrom, reciprocating delivery and compensating loops in said apron, racks to actuate the respective loops, and intermediate gearing to connect said racks and cause opposite movement thereof.

20. A machine for handling plastic materials containing in combination a hopper, an endless delivery apron to convey the contents therefrom, reciprocating delivery and compensating loops in said apron, racks to actuate the respective loops, and intermediate differential gearing connecting said racks and to produce opposite movements thereof at different rates of speed, one relative to the other.

21. A machine for handling plastic materials containing in combination a hopper, an endless delivery apron to convey the contents therefrom, reciprocating delivery and compensating loops in said apron, racks to actuate the respective loops, intermediate differential gearing connecting said racks and to produce opposite movements thereof at different rates of speed, one relative to the other, and takeup means having to and fro movement for and transverse to the direction of travel of said apron.

22. A machine for handling plastic materials containing in combination a hopper, an endless delivery apron to convey the contents therefrom, reciprocating delivery and compensating loops in said apron, racks to actuate the respective loops, intermediate differential gearing connecting said racks and to produce opposite movements thereof at different rates of speed one relative to the other, a take-up roller, an oscillatory carrier therefor, an oscillatory operating lever, and a connecting rod between the latter and said oscillatory carrier, to cause to and fro takeup movement of said takeup roller.

23. A machine for handling plastic materials containing in combination a hopper, a movable sheet delivery apron constituting a part of the hopper wall, and means providing a reciprocatory delivery loop in said apron.

24. A machine for handling plastic materials containing in combination a hopper, a traveling sheet delivery apron, means forcibly to press a plastic sheet against one face only of said apron, and means to impart continuous movement to one part of said apron and intermittent movement to another part thereof.

25. A machine for handling plastic materials containing in combination a hopper, a traveling sheet delivery apron constituting a part of the hopper wall, means to impart continuous driving movement to said hopper wall-forming portion of said apron and to impart intermittent deposit movement to another part thereof.

26. A machine for handling plastic materials containing in combination a hopper, endless delivery and receiving carriers, means to provide a reciprocatory delivery loop in the delivery carrier and an intermittent movement of the carrying portion of said carrier, said loop reciprocating to and fro across the receiving carrier, and means to impart traveling movement to said receiving carrier during arrested movement of said delivery carrier.

27. A machine for handling plastic materials containing in combination a continuously-traveling receiving apron, a hopper, a wall of which is constituted in part by said apron, means to deliver a plastic sheet continuously upon said delivery apron, and means to cause a loop of the latter to have to and fro movement to discharge said sheet from said apron.

28. A machine for continuously sheeting plastic material such as dough and the like, containing in combination, a hopper for a batch of material, means including a cooperating sheeting roll and travelling apron providing moving converging areas below said hopper for continuously withdrawing the contents of said hopper, said apron passing under said roll and thence laterally away therefrom whereby said material is continuously pressed in sheet form against said apron by said roll in progressively increasing degrees of pressure to firmly impress the plastic sheet against said apron and for continuously conveying the sheet to a point laterally removed therefrom.

29. The method of continuously sheeting plastic material such as dough and the like, for reducing it to sheet form in uniform width and thickness, and conveying it laterally to a point removed therefrom, which consists in continuously withdrawing the material from a hopper by the moving converging surfaces of a cooperating sheeting roll and apron, causing said roll to continuously impress said material on said apron in progressively increasing degrees to reduce said material to sheet form of uniform thickness, and maintaining such pressure for a period sufficiently long to impress said material firmly against said apron to avoid contraction of the plastic material on the apron after release of the pressure and while being continuously conveyed by said apron laterally away from the sheeting zone.

30. A machine for handling plastic sheet material containing, in combination, means for moving a plastic dough sheet continuously, including a travelling apron for supporting and conveying said sheet to a delivery section, means for imparting to the delivery section of said apron a horizontal to-and-fro movement, a receiving member, the continuous movement of said apron and the horizontal to-and-fro movement of the delivery section providing means for continuously depositing the sheet material in overlapping folded relation on the receiving member during opposite movements of the delivery section.

In testimony whereof, we have signed our names to this specification.

THOMAS LUTHER GREEN.
CHARLES HERBERT WILLIAMS.